Feb. 16, 1926.  1,573,315
J. T. GRIFFIN
METHOD OF CEMENTING TWO PARTS TOGETHER
Filed Sept. 12, 1922
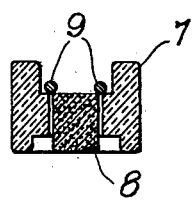
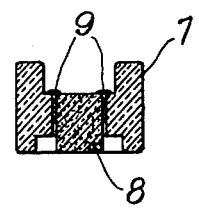
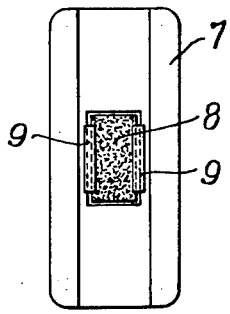
Inventor
James T. Griffin
by  　　　　　 Atty.

Patented Feb. 16, 1926.

1,573,315

UNITED STATES PATENT OFFICE.

JAMES THOMAS GRIFFIN, OF OAK PARK, ILLINOIS, ASSIGNOR TO WESTERN ELECTRIC COMPANY, INCORPORATED, OF NEW YORK, N. Y., A CORPORATION OF NEW YORK.

METHOD OF CEMENTING TWO PARTS TOGETHER.

Application filed September 12, 1922. Serial No. 587,674.

*To all whom it may concern:*

Be it known that I, JAMES THOMAS GRIFFIN, a citizen of the United States, residing at Oak Park, in the county of Cook and State of Illinois, have invented certain new and useful Improvements in a Method of Cementing Two Parts Together, of which the following is a full, clear, concise, and exact description.

This invention relates to a method of cementing two parts together, and more particularly to an improved method of assembling protector blocks used in open space cut-outs.

It has heretofore been the practice in assembling protector blocks to secure the carbon block in the porcelain block by some cementing material such as a low melting point glass, the cementing material being made up in rods of small diameter, one end of the rod being placed adjacent surfaces of the carbon and porcelain blocks while the said blocks were at a temperature sufficiently high to melt the glass, whereby the glass adheres to the said blocks and served to cement them together. In practice it has been found that the making of the glass rods is expensive, and since they are small and exceedingly fragile they are easily broken in handling, producing many lengths which are too short for an operator to manipulate in cementing the blocks together, whereby a large wastage of glass rods has resulted.

The primary object of the present invention is to provide a method of cementing the porcelain and carbon blocks together, which may be practiced more rapidly than the method above described and at the same time with less expense and practically no wastage of the cementing material.

To attain these objects and in accordance with a feature of the invention, a method of manufacture is provided in which the carbon block is placed in its approximate position in the porcelain block and then a small tablet of cementing material positioned adjacent the two contacting portions of the said blocks. The assembled blocks are then heated by placing them in an oven, or in any other suitable manner, to a temperature sufficient to melt the cement tablet so that it adheres to the contacting surfaces of the blocks to secure them together. After cooling, the assembled block may then be reheated and the carbon accurately depressed the distance required to give the desired separation required for the assembled cut-out by the method and apparatus described in patent to R. E. Ottman No. 1,406,681 of February 14, 1922.

Other features of the invention will be more clearly understood by reference to the attached drawings in which, Fig. 1 is an enlarged vertical sectional view showing a protector block assembled with the cement tablets applied thereto previous to the heating of the block;

Fig. 2 is a top plan view thereof;

Fig. 3 is an enlarged vertical sectional view illustrating the assembled protector block after it has been heated and showing the manner in which the melted tablets adhere to the contacting surfaces of the carbon and porcelain blocks.

Referring now to the drawings in detail, 7 represents a block of porcelain or similar insulating material in which is secured a carbon electrode 8. To secure the electrode and block together tablets 9 of cementing material are placed in the positions illustrated in Fig. 1 in which they lie against adjacent surfaces of the said blocks. The assembled protector is then heated by placing it in an oven, or any other suitable manner, to a temperature sufficient to melt the tablets, causing them to flow in between the adjacent surfaces of the carbon electrode and porcelain block in the manner illustrated in Fig. 3. The protector is then removed from the furnace, and in cooling, the cementing material solidifies, securing the blocks in their assembled positions. The block may then be reheated at a temperature at which the cement becomes plastic or soft and the carbon block accurately depressed the distance required to give the specified separation required for the assembled cut-out by the method and apparatus disclosed in the Ottman patent heretofore referred to.

In practice it has been found preferable to form the tablet of cementing material out of a low melting point vitreous material. A vitreous cementing material well adapted for this purpose may be of the character disclosed in my co-pending application, Serial No. 507,673, filed September 12, 1922. This cement comprises a vitreous material granulated and then compressed to form a tablet. A particularly suitable cement comprises lead borate glass, consisting of approximately 85% lead oxide and 15% boric acid. To assist in forming a tablet from this material a volatile binder is mixed with the lead borate. Preferably powdered naphthalene is used as a binder, since it will be completely volatilized when the tablet is melted, leaving no trace in the lead borate.

In heating the protector block to melt the lead borate for cementing the carbon and porcelain blocks together, it has been found desirable to heat the top of the block, upon which the lead borate tablets are deposited, to a higher temperature than the bottom of the block, whereby the cement is prevented from flowing down the carbon block, through the space between it and the porcelain, and onto the contact surface of the carbon block. The assembled protector is only heated for a short length of time and the lead borate only flows part way through the space between the carbon block and the porcelain block as is shown in Fig. 3.

Where this method is employed to cement a carbon part which is heated during the cementing operation, such as in the assembly of protector blocks, which are preferably heated in a muffle furnace at a temperature sufficient to soften the vitreous cementing material, the use of a hydrocarbon binder such as naphthalene has several advantages. The naphthalene serves as a binder for the vitreous material, as has already been mentioned, and furthermore, in volatilizing reduces the oxygen content of the air in the furnace, whereby a softening or dusting of the carbon part is reduced to a minimum.

What is claimed is:

1. The method of securing two parts together, consisting in placing a tablet of cementing material adjacent the point where the joint is to be made, said tablet being composed of cementing material with a volatilizing binder, and then subjecting the parts to a temperature sufficiently high to cause the cement tablet to soften and adhere to both of the said parts to cause a union between them and a volatilization of the binder.

2. The method of securing a carbon part to a porcelain part, consisting in placing a tablet of vitreous material adjacent the point where the joint between the parts is to be made, and then subjecting the parts to a temperature high enough to cause the tablet to soften and adhere to both of said parts to cause a union between them.

3. The method of securing a carbon part to a porcelain part, consisting in placing a tablet of cementing material adjacent the point where the joint between the parts is to be made, said tablet comprising granulated vitreous material with a volatilizing binder, and then subjecting the parts to a temperature sufficiently high to cause a volatilization of the binder and the vitreous material to soften and adhere to both of the said parts to cause a union between them.

4. The method of securing a carbon part to a porcelain part, consisting in placing a tablet of cementing material adjacent the point where the joint between the parts is to be made, said tablet comprising granulated lead borate glass and a binder of naphthalene, and then subjecting the parts to a temperature high enough to cause a volatilization of the naphthalene and the lead borate to soften and adhere to both of the said parts to cause a union between them.

5. The method of assembling a protector block, which consists in depositing a conducting electrode in an opening formed in a non-conducting block to receive it, placing a tablet of cementing material adjacent the electrode and block, and then subjecting the block and electrode to a temperature sufficiently high to soften the cement tablet and cause it to adhere to both the block and electrode to effect a union between them.

6. A method of assembling protector blocks, which consists in depositing a conducting electrode in an opening formed in a non-conducting block to receive it, placing a tablet of low melting point cementing material adjacent a contact point between the electrode and block, and then subjecting the block and electrode to a temperature high enough to soften the tablet and cause it to adhere to the block and electrode to effect a union between them.

7. The method of assembling a protector block, which consists in depositing a conducting electrode in an opening formed in a non-conducting block to receive it, placing a tablet of cementing material adjacent the upper surfaces of the electrode and block, and then subjecting the top and sides of the electrode and block to a temperature sufficiently high to soften the cement and cause it to adhere to both the block and electrode while maintaining the bottom of the block and electrode sufficiently cool to prevent the cementing material from flowing down completely through the opening in the block.

8. The method of securing a carbon part to a porcelain part, consisting in placing a tablet of cementing material adjacent the point where the joint between the parts is to be made, said tablet comprising granulated vitreous material and a hydrocarbon binder and then heating the parts in a muffle furnace at a temperature high enough to cause a volatilization of the hydrocarbon and the vitreous material to soften and adhere to both of said parts, the volatilization of the hydrocarbon reducing the oxygen content of the air in the muffle whereby softening or dusting of the carbon part is reduced to a minimum.

In witness whereof, I hereunto subscribe my name this 30th day of August A. D., 1922.

JAMES THOMAS GRIFFIN.